United States Patent [19]

Mitsuhashi

[11] 4,130,876
[45] Dec. 19, 1978

[54] METHOD OF AND APPARATUS FOR COMPOSING APPROXIMATE SINUSOIDAL WAVEFORM

[75] Inventor: Yasuhiro Mitsuhashi, Hamamatsu, Japan

[73] Assignee: Nippon Gakki Seizo Kabushiki Kaisha, Hamamatsu, Japan

[21] Appl. No.: 801,023

[22] Filed: May 27, 1977

[51] Int. Cl.$^2$ ............................................. G06F 15/34
[52] U.S. Cl. ...................................... 364/721; 328/14
[58] Field of Search ................... 235/152, 197; 328/14; 364/721

[56] References Cited

U.S. PATENT DOCUMENTS

| | | | |
|---|---|---|---|
| 3,033,453 | 5/1962 | Lode | 235/153 B |
| 3,657,657 | 4/1972 | Jefferson | 328/14 |
| 3,925,654 | 12/1975 | Roantree et al. | 235/152 X |

Primary Examiner—Jerry Smith
Attorney, Agent, or Firm—Koda and Androlia

[57] ABSTRACT

A sinusoidal waveform is approximated by alternately connecting downward opening parabolic curves and upwardly opening parabolic curves at their open ends. A variable input digital representation changing at a certain rate is subjected to a coordinate conversion and squaring operation to provide amplitude samples to constitute a quasi-sinusoidal waveform. All the operations are performed through logical circuits without using a read only memory.

4 Claims, 15 Drawing Figures

_Fig.1c_

_Fig.1d_

METHOD OF AND APPARATUS FOR COMPOSING APPROXIMATE SINUSOIDAL WAVEFORM

BACKGROUND OF THE INVENTION

This invention relates to a method of and an apparatus for composing an approximate sinusoidal waveform by utilizing a squaring operation and a coordinate conversion process.

It is generally well known that any type of waveform can be obtained by such a method wherein the digital words indicative of a waveform are memorized in a memory device such as a read only memory (ROM) and read out by accessing its addresses by an input variable. This method is called a table look-up method since it is similar to a method of reading a function table. However, it has such disadvantages that a large number of read only memories are required to reduce quantization noise and therefore its reading speed is comparatively low. For example, if the number of address bits is increased by one to reduce the quantization noise to one half, then the table scale or data to be memorized is doubled compared with the original, thus resulting in enlargement of the hardware. When the data and the addresses are both expressed by twelve bits, the memory capacity should be as large as approximately 48 K bits (K = 1024). In general, to avoid such increase of memory capacity, the so called interpolation process may be utilized. In this process, the data for the points between respective adajacent addresses are calculated through an interpolation operation. But to perform such an interpolation process, multiplication circuits and other circuits associated therewith will necessarily be required, and therefore simplification of the hardware is almost impossible when considering the total hardware so long as the interpolation process is employed.

SUMMARY OF THE INVENTION

It is therefore an object of this invention to provide a novel method of and an apparatus for composing an approximate sinusoidal waveform by the use of a minimum of hardware.

It is another object of the present invention to provide a waveform composing method and apparatus wherein approximate sinusoidal waveforms can be obtained through only a logical operation without using a memory device such as a read only memory.

It is still another object of the present invention to provide a method and an apparatus for obtaining a digitally represented approximate sinusoidal waveform which is analog-converted and effectively usable for synthesizing musical tones.

One feature of the present invention is to obtain a sinusoidal waveform approximated by square curves (parabolic curves) by applying a squaring operation and a coordinate conversion process to an input variable or phase input which specifies in digital fashion the amplitude samples for each phase and which input increases or decreases at a constant rate. According to the present invention, the squaring operation and the coordinate conversion process are all performed through a logical operation, so that the composition of waveforms can be attained by means of a small quantity of hardware without using a read only memory and the like. Also in this invention, the quantization noise can be reduced by increasing the number of phase points to be accessed and the number bits used for representing the amplitude values, but the increase in hardware resulting therefrom is less as compared with a table look-up method. In addition, the table look-up method is not suitable for a serial operation because the accessing of addresses must be performed in parallel, while the squaring operation method according to this invention can be effectively used for both parallel and serial systems. When a complete sinusoidal waveform is needed, the sinusoidal waveform approximated by square curves can not be used as an exact sinusoid, but can be used as a waveform of a tone source for synthesizing musical tones.

BRIEF DESCRIPTION OF THE DRAWINGS

The above, as well as other objects, features and advantages of the invention will become apparent and better understood by reference to the following detailed description when considered in connection with the accompanying drawings wherein.

DETAILED DESCRIPTION OF THE INVENTION

Referring now to FIGS. 1a–1g, there is shown a series of processes for composing a waveform in accordance with one embodiment of this invention. In these drawings, an abscissa axis shows a phase ranging from 0 to $2\pi$ with respect to each of the first of the fourth quadrants and an ordinate axis shows its amplitude with the maximum normalized as 1.

Figure 1A:
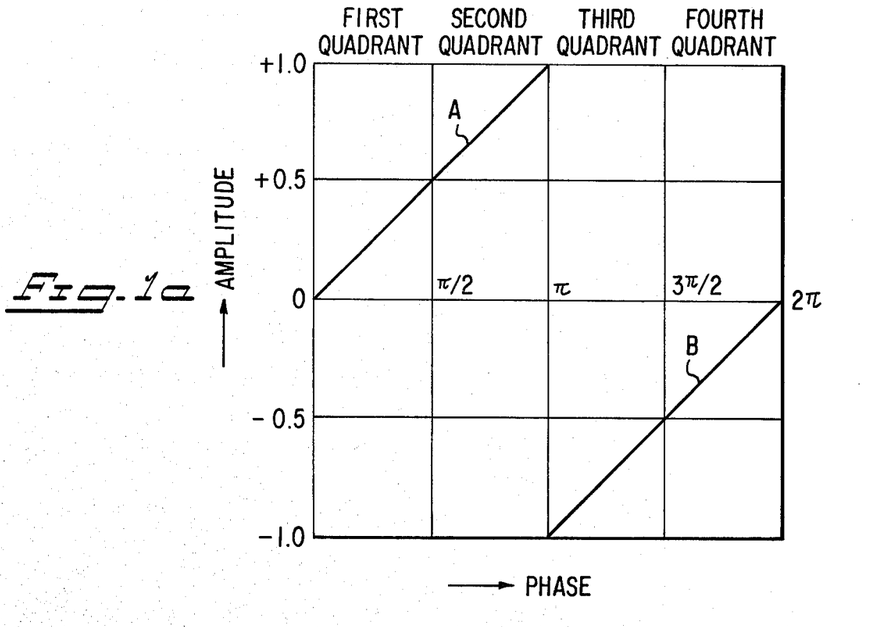
FIGS. 1a–1g are graphs illustrating phase-amplitude relationships for explaining a method for composing an approximate sinusoidal waveform in accordance with one embodiment of the present invention.

The phase input or input variable consists of binary codes (of five digits in this embodiment) expressed in 2's complement system where the negative values are expressed by the respective complements against the n-th power of 2 ($2^5 = 32$ in this embodiment) with the most significant bit (MSB) serving as a sign bit, and this phase input also corresponds to an address input in the case of the table look-up method. The actual phase input is not an analog or consecutive quantity, but a digital and stepwise quantity. However, for explanatory purposes, the amplitudes in FIGS. 1a–1g are taken to be varied continuously with respect to the variation in phase. Thus, the phase input in FIG. 1a is shown as a straight line having a constant slope, labeled A and B. This rising straight line shows that the amplitude for each phase increases at a constant rate. As will be clearly understood from a description that will be made later, a phase input approximated by a descending straight line where the amplitude for each phase decreases at a constant rate may be used instead of the rising straight line provided that an appropriate coordinate conversion process is applied.

Figure 1B:
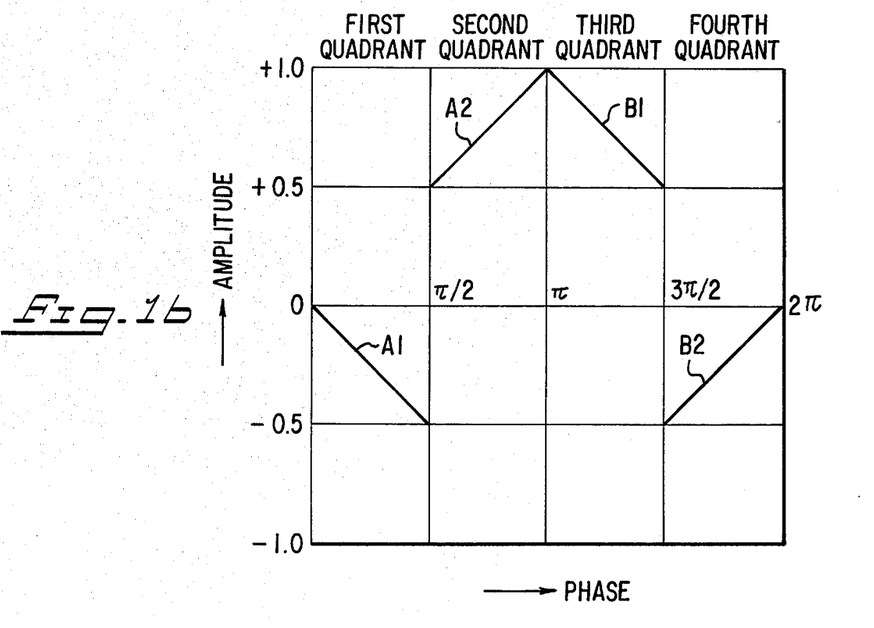

Next, with respect to the phase inputs approximately expressed by the straight lines A and B in FIG. 1a, 1's complements (complements against 11111 in binary notation) are taken for the data in the first and the third quadrants so that the coordinate conversion is carried out as illustrated in FIG. 1b.

As a result, the straight line A is changed to the straight line A1 and A2, and the straight line B to B1 and B2, respectively. The detection of the first and the third quadrants is done by checking or ascertaining whether the second bit from the left of a phase input binary code, namely the second most significant bit, (SMSB) is zero (0).

Figure 1C:
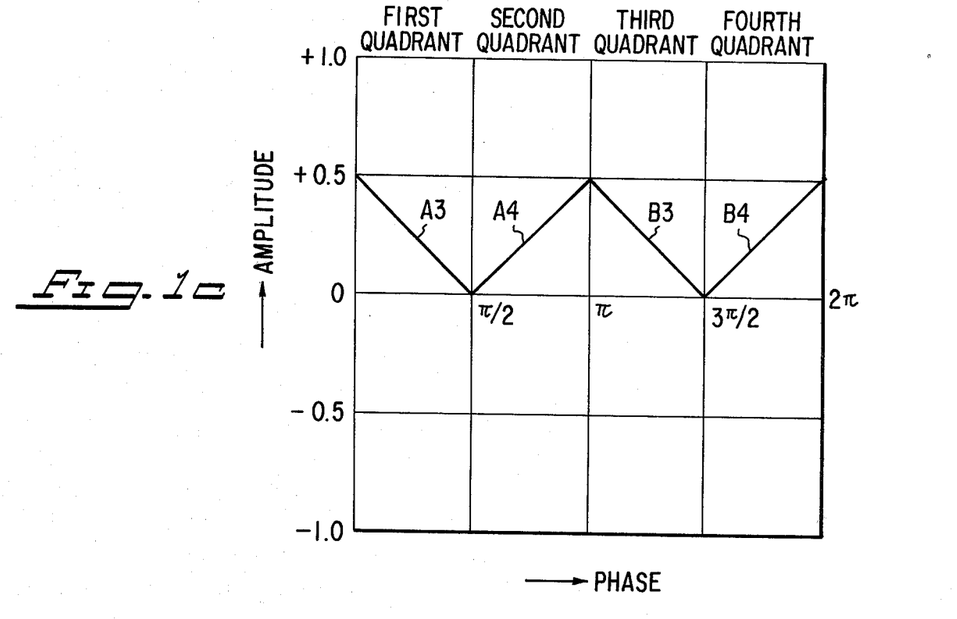
Figure 1D:
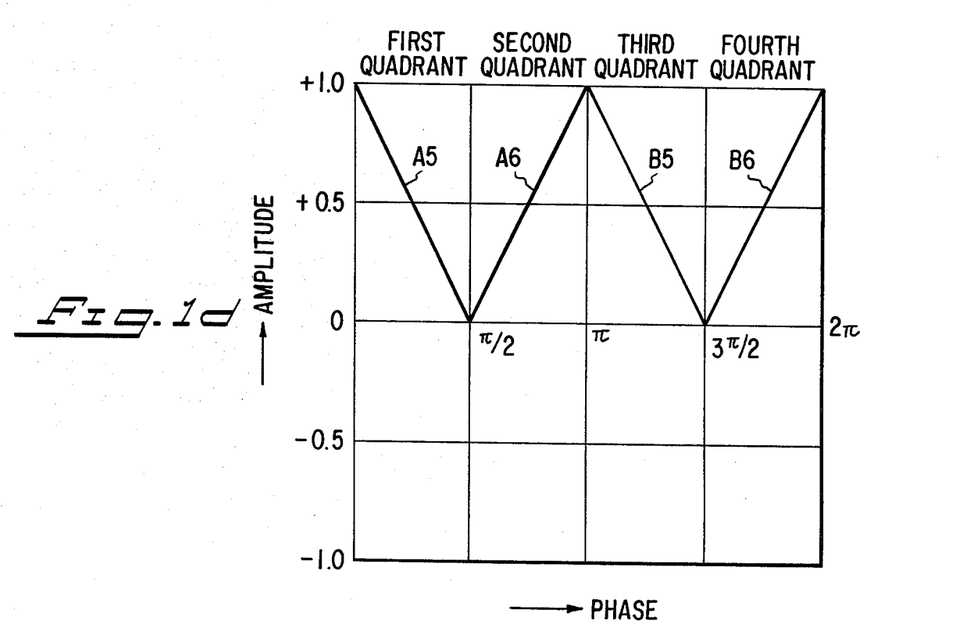

In the next step, the most significant bit (MSB) and the second most significant bit (SMSB) are set to zero (0) through a logical masking so that the absolute values (defined by three digits) of the amplitudes are extracted. FIG. 1c shows the changes in the absolute values of the amplitudes are extracted. FIG. 1c shows the changes in the absolute values of the amplitudes by the connection of the straight lines A3, A4, B3, and B4.

The absolute values of the amplitudes are then doubled (multiplied by 2) by shifting the digital values by one bit toward the left. The amplitude variation is shown by the straight lines A5, A6, B5, and B6 in FIG. 1d. This process is carried out in order to increase the degree of approximation of the resultant waveform to a sinusoidal wave.

Figure 1E:
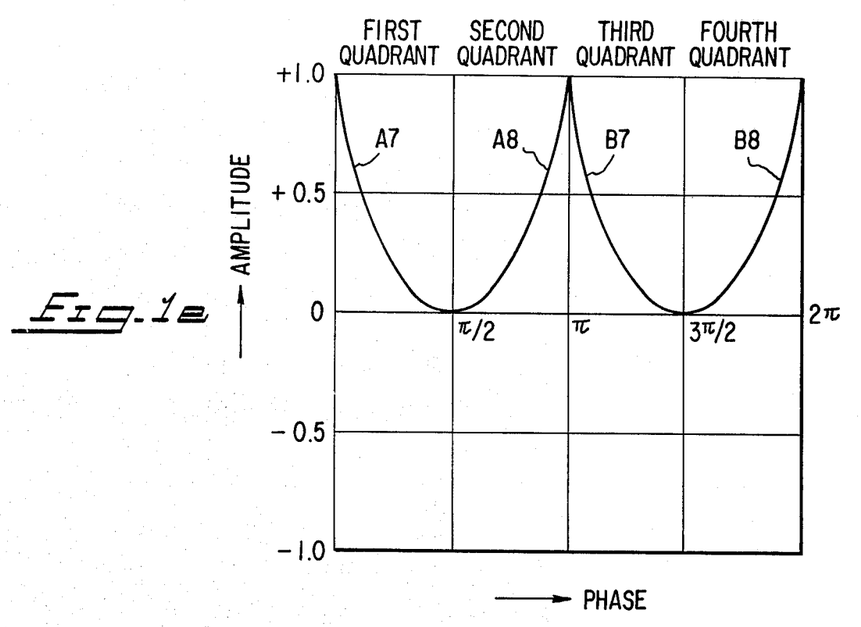

Next, the amplitude variation shown by the curves A7, A8, B7, and B8 in FIG. 1e is obtained by squaring the absolute values of the amplitudes doubled at the previous stage.

Figure 1F:
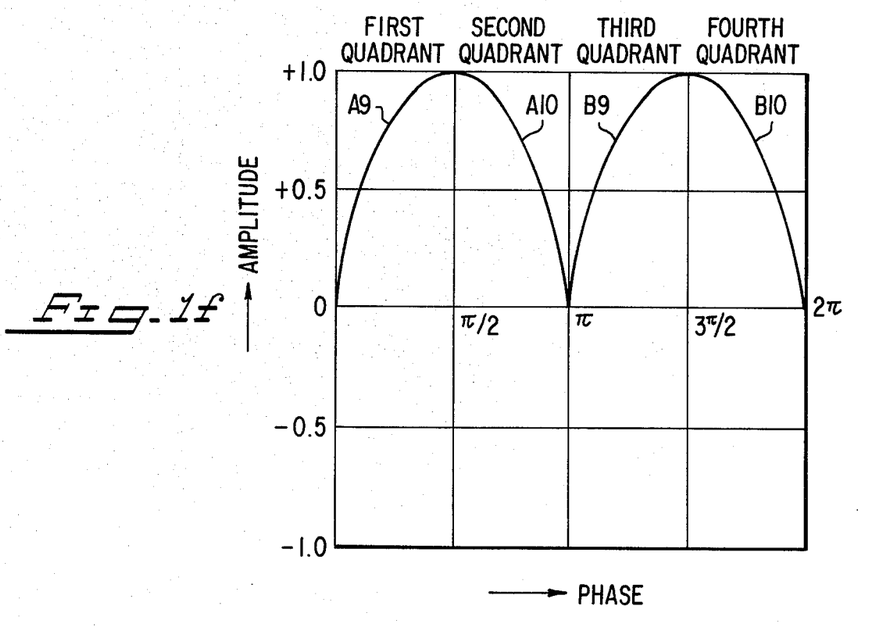

The square values of the absolute values are converted in coordinate by subtracting it from a constant "1" as illustrated by the curves A9, A10, B9, and B10 in FIG. 1f.

Figure 1G:
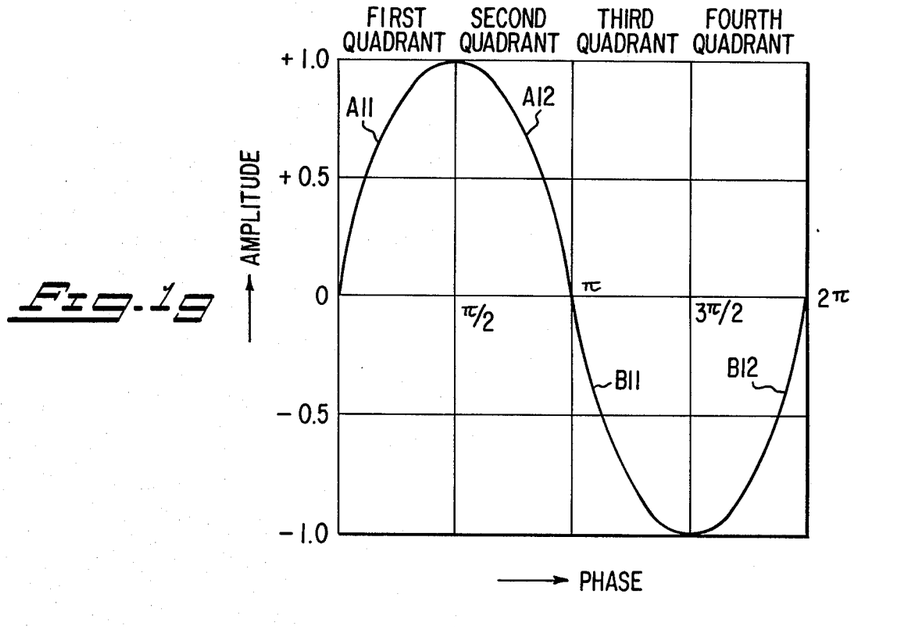

In addition, the coordinate conversion of the data for the third and the fourth quadrants is performed by taking 1's complement as shown in FIG. 1g, and then the sinusoidal waveform for one cycle approximated by the square curves A11, A12, B11, and B12 is obtained. The detection of the third and the fourth quadrants in this case will be made by checking or ascertaining whether the most significant bit (MSB) of the phase input is 1.

The approximate sinusoidal wave obtained by the abovementioned process will be expressed by the following equation.

$$f(\theta) = \frac{32}{\pi 3}(\sin\theta + \frac{1}{3^3}\sin 3\theta + \frac{1}{5^3}\sin 5\theta + \frac{1}{7^3}\sin 7\theta + \frac{1}{9^3}\sin 9\theta) \quad (1)$$

In the abovementioned equation (1), $\theta$ shows a phase that is treated as variable, and $f(\theta)$ shows a function of the variable $\theta$. As clearly understood from the equation (1), the function waveform produced by the approximate waveform composing method in accordance with the present invention includes a large number of odd harmonies, in addition to a fundamental wave. It is therefore very effective for composing music sounds wherein harmonic-rich waveforms are needed. The mathematical expressions relating to the operations for each quadrant carried out in the abovementioned process are as follows. It is assumed that X represents a "variable" and Y represents a "function," in the following equation.

(a) For the first quadrant; $0 \leq X < \frac{1}{2}$ $$Y = \left\{ [(-\frac{\pi}{X} + \frac{1}{2}) \times 2]^2 - 1 \right\} \times (-1) \quad (2)$$

(b) For the second quadrant; $\frac{1}{2} \leq X < 1$ $$Y = \left\{ [(+\frac{X}{\pi} - \frac{1}{2}) \times 2]^2 - 1 \right\} \times (-1) \quad (3)$$

(c) For the third quadrant; $-\frac{1}{2} \leq x < 0$ $$Y = \left\{ [(-\frac{X}{\pi} - \frac{1}{2}) \times 2]^2 - 1 \right\} \times (+1) \quad (4)$$

(d) For the fourth quadrant; $-1 \leq X < -\frac{1}{2}$ $$Y = \left\{ [(+\frac{X}{\pi} + \frac{1}{2}) \times 2]^2 - 1 \right\} \times (+1) \quad (5)$$

Figure 2:
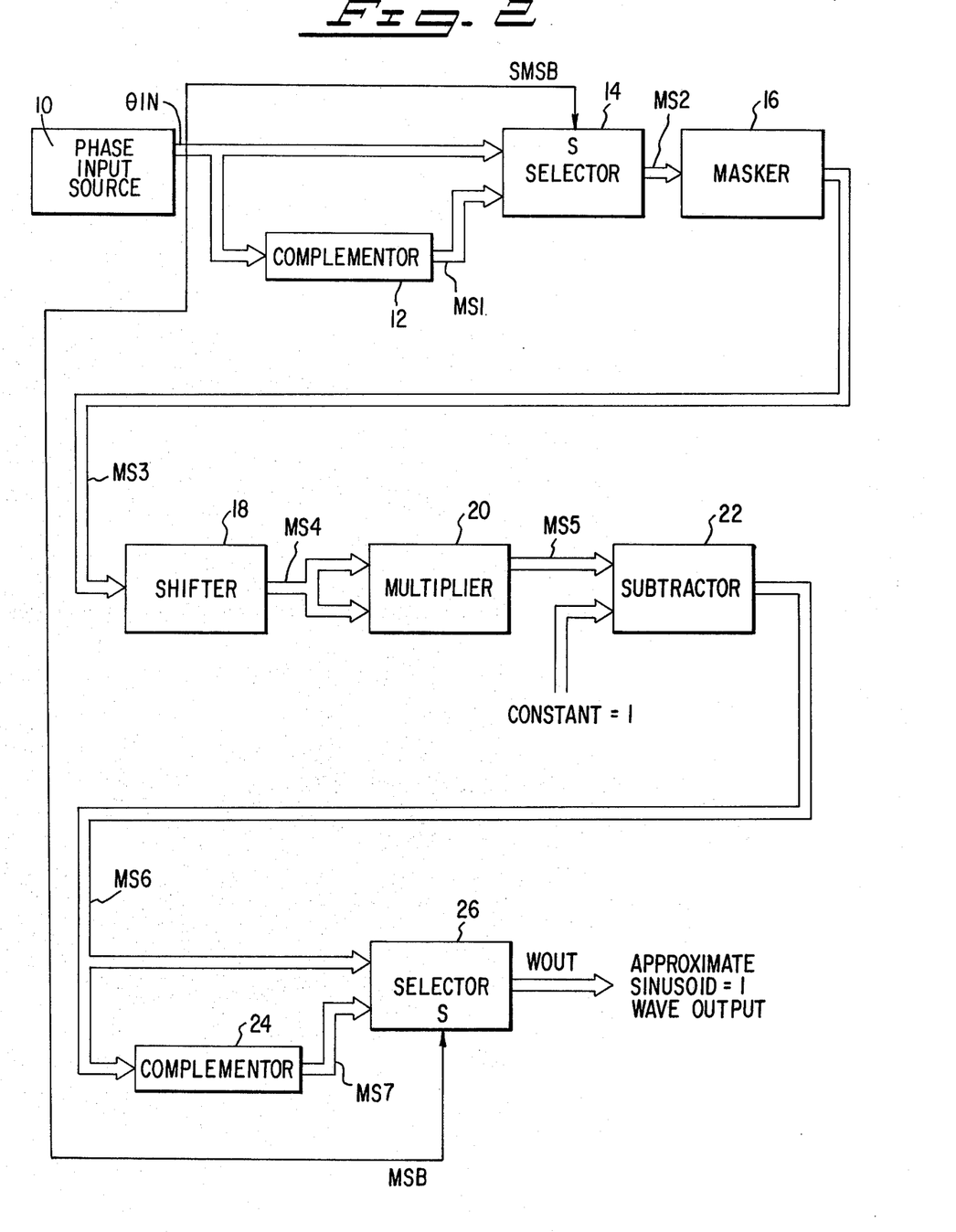
FIG. 2 is a block diagram of an apparatus for carrying out the above-mentioned method.

FIG. 2 illustrates a hardware arrangement for carrying out the process of the embodiment mentioned above. The waveform composing system in this example utilizes a parallel operation system, but a serial operation system can also be employed.

A phase input source 10 generates a phase input $\theta$ IN corresponding to an address expressed by 2's complement as described before with respect to FIG. 1a, and the phase input $\theta$ IN is applied to one terminal of a selector 14 on one hand, and also applied to a complementor 12 on the other hand. The output MS1 of the complementor 12 is applied to the other input terminal of the selector 14. The selector 14 receives the second most significant bit SMSB of the phase input $\theta$ IN at the selection input terminals S thereof and selects its input depending on the contents of SMSB. In short, the selector 14 provides the output MS1 of the complementor 12 as the output MS2 if SMSB = 0, and provides the phase input $\theta$ IN as the output MS2 if SMSB = 1. This operation corresponds to the process indicated in FIG. 1b. A masker 16 receives the output MS2 of the selector 14 and generates its output MS3 indicative of the absolute value of the amplitude by making the most significant bit MSB and the second most significant bit SMSB zero (0). This operation corresponds to the process illustrated in FIG. 1c.

A shifter 18 receives the output MS3 which contains the upper two bits logically masked, and makes its input double by shifting it leftward by one bit. This operation corresponds to the process illustrated in FIG. 1d. The output MS4 of the shifter 18 is applied to a multiplicand input terminal and a multiplier input terminal of a multiplier 20. The multiplier 20 generates the square output MS5. This operation corresponds to the process illustrated in FIG. 1e. The square output MS5 is applied to a subtrahend input terminal of a subtractor 22 which also receives an input of constant "1" at a minuend input terminal. Then, the subtractor 22 generates the output MS6 indicative of a subtracted value between the two inputs. This operation corresponds to the process illustrated in FIG. 1f.

The subtraction output MS6 is applied to one input terminal of a selector 26 on one hand, and also applied to a complementor 24 on the other hand. The output MS7 of the complementor 24 is applied to the other input terminal of the selector 26. The selector 26 also receives the most significant bit (MSB) of the phase input θ IN at the selection input terminal S thereof and selects its input depending on the contents of MSB. In short, the selector 26 provides the subtraction output MS6 as the output WOUT if MSB = 0, and provides the output MS7 of the complementor 24 as the output WOUT if MSB = 1. This operation corresponds to the process illustrated in FIG. 1g. Consequently, the output WOUT from the selector 26 represents the sinusoidal wave approximated by square curves and expressed digitally by binary codes.

Figure 3:
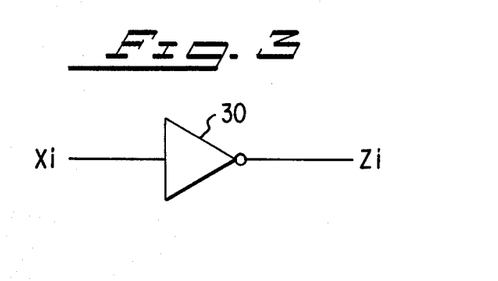
FIGS. 3–6 are circuit diagrams illustrating the internal arrangement of the various block portions in the apparatus shown in FIG. 2.
Figure 4:
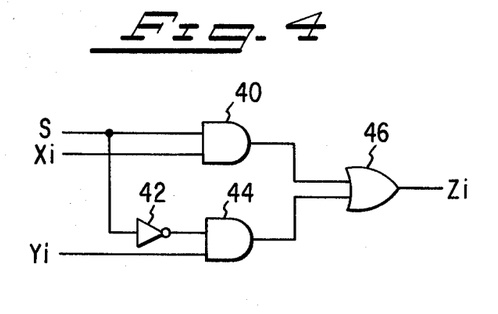

In the abovementioned waveform composing system, the multiplier 20 and the subtracter 22 can be of the conventional parallel input-parallel output type. In addition, the complementors 12 and 24 used for taking 1's complement can be readily realized by arranging an inverter 30 of FIG. 3 in parallel for each bit. In FIG. 3, Xi shows an input terminal for optional bits and Zi shows an output terminal corresponding thereto. The selectors 14 and 26 can be constituted by arranging a logical circuit, for example, of FIG. 4 in parallel for each bit. The logical circuit in FIG. 4 comprises an AND gate 40 whose one input terminal receives the selection input S and whose other input terminal receives the optional bit Xi of the data input X, and an AND gate 44 whose one input terminal receives the selection input S through an inverter 42 and whose other input terminal receives the optional bit Yi (corresponding bit to Xi) of the data input Y. The outputs of the gates 40 and 44 are connected to respective input terminals of an OR gate 46. Then, the OR gate 46 provides, as the output Zi, either the bit Xi of the data X or the bit Yi of the data Y, which data is selected according to the contents of the selection input S.

Figure 5A:
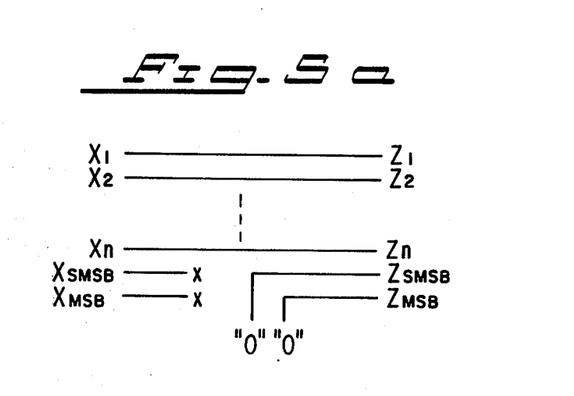
Figure 5B:
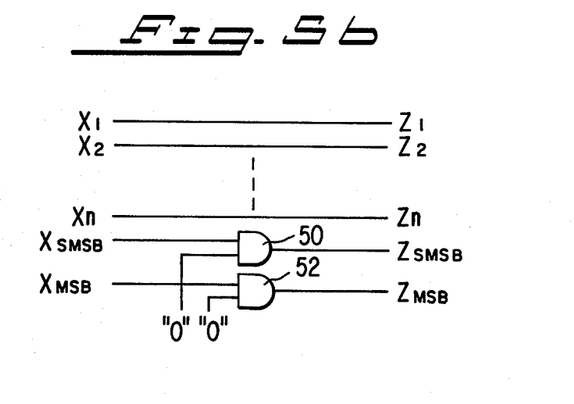

FIGS. 5a and 5b show two typical examples of the masker 16. In the circuit shown in FIG. 5a, parallel input bits X1-Xn are tranmitted, as they are, to the respective output terminals labeled Z1-Zn, but the upper most two bits XSMSB and XMSB do not appear at their respective corresponding outputs ZSMSB and ZMSB since transmission lines are not provided therebetween. Consequently, at each of the outputs ZSMSB and ZMSB, "0" is always provided. The similar logical masking function attained by the circuit in FIG. 5a can also be accomplished by such circuit as shown in FIG. 5b. In FIG. 5b, AND gates 50 and 52 are inserted in the transmission lines for the two upper most bits, and at each one of the input terminals of the AND gates 50 and 52, "0" is provided.

Figure 6:
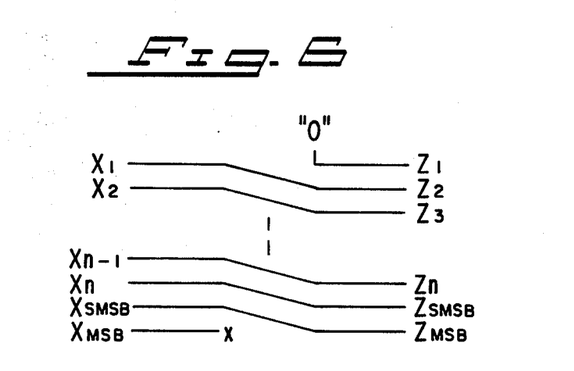

FIG. 6 shows a preferred embodiment of the shifter 18. The so called "wiring shift" as shown in FIG. 6 is preferable in view of simplification. In the circuit of FIG. 6, since the most significant input bit XMSB is not used and the wirings receiving the input bits X1 - XSMSB are connected to the outputs Z2 - ZMSB' 1-bit left shifting is thereby attained. Besides, at the output Z1, a signal "0" is provided from another line.

In the case of the waveform composing system mentioned above, even if the number of a bit is increased to reduce the quantization noise, the hardware will not be increased so much as compared with the table look-up system, since a read only memory is not utilized therein. Thus, it can operate at a comparatively high speed.

Figure 7A:
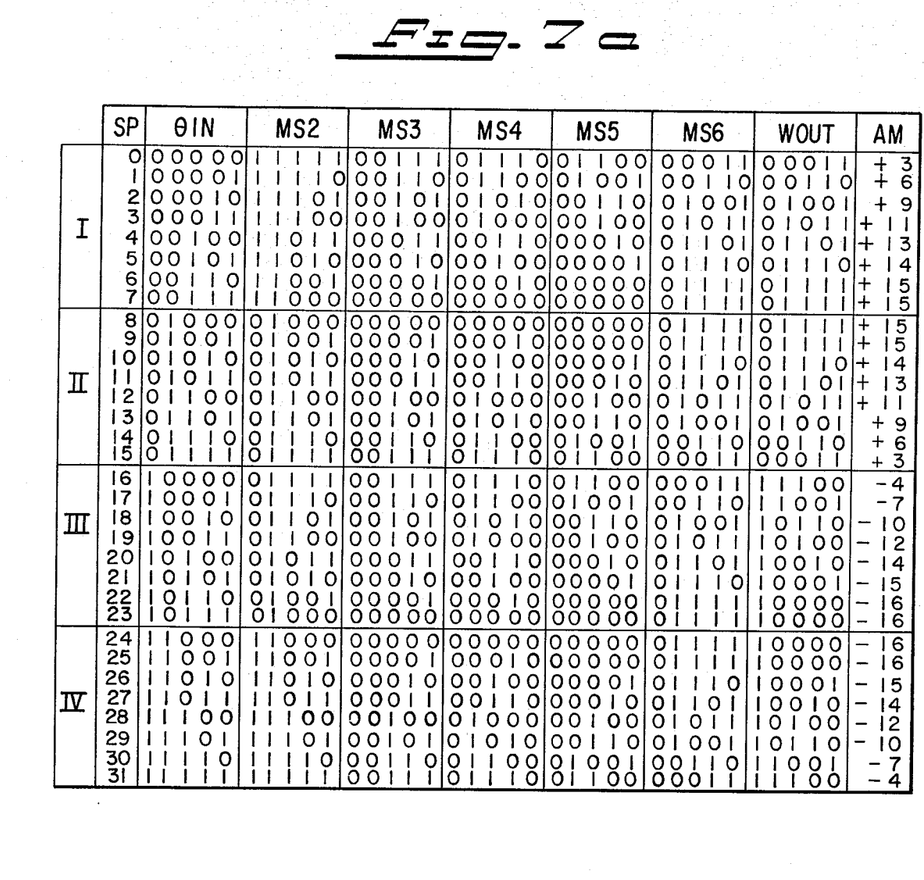
FIGS. 7a and 7b are a binary signal table and a waveform chart, respectively, illustrating an example of waveform composition executed by the apparatus in FIG. 2.
Figure 7B:
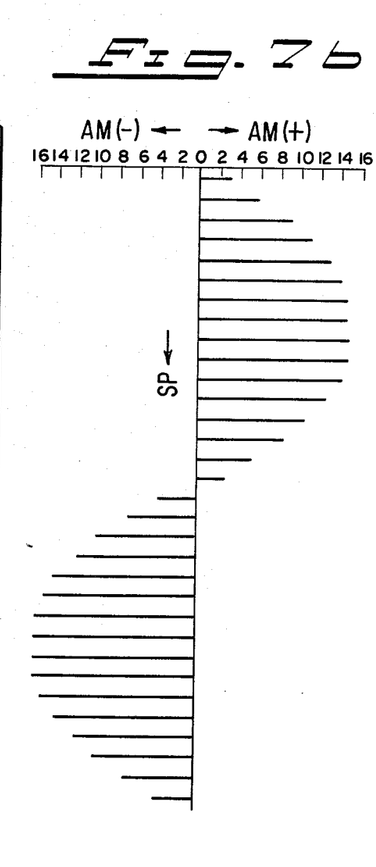

FIGS. 7a and 7b show the results of waveform composition obtained by use of the embodiment described above. The example in FIG. 7a shows the amplitude values for 32 (0-31) sample points (phases) obtained through the aforedescribed logical operation or waveform composing system. In the table, I-IV show the quadrant number and MS2-MS6 show intermediate signals corresponding to FIG. 2 and WOUT shows the waveform output. The phase input θ IN corresponds to that input wherein the phase input explained in conjunction with FIG. 1a is digitally expressed by use of a 5 bit binary code. Similarly, the intermediate signals MS2-MS6 and the waveform output WOUT correspond to these signals wherein the intermediate signals and the output referred to FIGS. 1b–1f and FIG. 1g, respectively, are digitally expressed. The amplitude AM corresponds to the waveform output WOUT when expressed by a decimal number.

FIG. 7b shows a graphical expression of the amplitude AM for all the sample points indicated in FIG. 7a. It can be clearly understood from this drawing that the envelope obtained by the amplitude variation approximately exhibits a sine wave.

It will be readily understood by those skilled in the art that the corresponding analog waveform can be obtained by converting the waveform output WOUT into analog information.

The waveform composing system according to this invention is not only useful for composing musical tones, but is also advantageous in various other applications.

I claim:

1. A method of composing an approximate sinusoidal waveform which comprises the steps of:
    producing digital phase inputs specifying in digital words the amplitude for each phase which varies at a substancially constant rate;
    detecting a quadrant to which each phase belongs by examining the sign of the amplitude of said phase inputs;
    extracting an absolute value of the amplitude for each of said phase inputs;
    squaring the exact extracted absolute value of the amplitude for each phase input; and
    applying a coordinate conversion process to the squared values for each of the detected third and fourth quadrants so as to form a sinusoidal waveform approximated by square curves.

2. A method of composing an approximate sinusoidal waveform, as recited in claim 1, which further comprises the step of multiplying the extracted absolute value of the amplitude by a pre-determined number to increase the degree of approximation of the resultant sinusoidal waveform to a sinusoidal wave after the absolute value has been extracted.

3. An apparatus for composing an approximate sinusoidal waveform comprising:
    a means for producing digital phase inputs specifying in digital words the amplitude for each phase which varies at a substantially constant rate;
    a means for detecting a quadrant to which each phase belongs by examining the sign of the amplitude of said phase inputs;
    a means for extracting an absolute value of the amplitude for each of said phase inputs;
    a means for squaring the extracted absolute value of the amplitude for each of said phase inputs; and
    a means for applying a coordinate conversion process to the squared values for each of the detected third and fourth quadrants so as to form a sinusoidal waveform approximated by square curves.

4. An apparatus for composing an approximate sinusoidal waveform comprising:
   means for producing digital phase inputs specifying in digital words first amplitudes constituting a first train of amplitudes which varies at a substantially constant rate;
   means for converting said first amplitudes to second amplitudes constituting a second train of amplitudes which alternately varies at substantially constant rate between a normalized maximum value and zero;
   means for squaring each value of said second amplitudes for each of said phase inputs to make third amplitudes thereby constituting a third train of amplitudes which exhibits repetitions of a first and second parabolic curved segment;
   means for converting said third amplitudes of every second parabolic curved segment so that open ends of said second parabolic curved segment locate at zero and all remaining portions of said second parabolic curved segment locate in a positive domain; and
   means for converting said third amplitudes of every first parabolic curved segment so that open ends of said first parabolic curved segment locate at zero and all remaining portions of said first parabolic curved segment locate in a negative domain.

* * * * *